May 7, 1929.  J. KROPENICKI ET AL  1,711,951
AUTOMATIC CONTROL VALVE
Filed Dec. 27, 1927   2 Sheets-Sheet 1

JOSEPH KROPENICKI
JOSEPH ZIELINSKI
INVENTOR

BY *Victor J. Evans*
ATTORNEY

WITNESS:

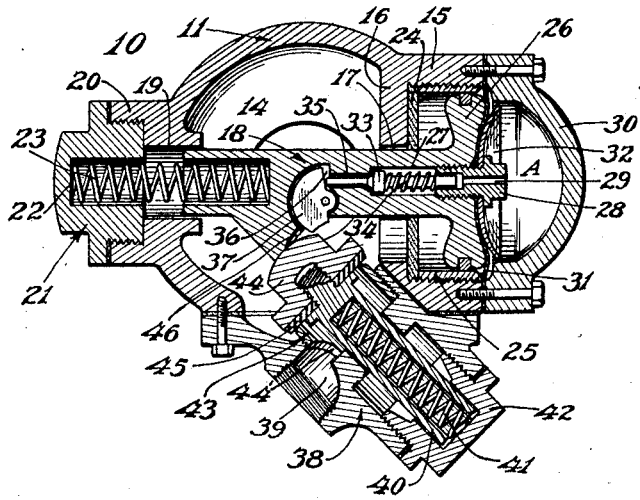
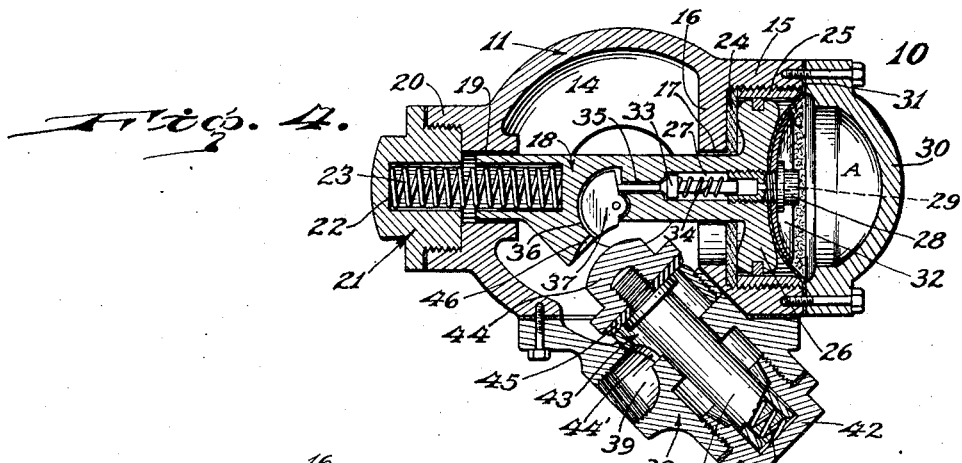
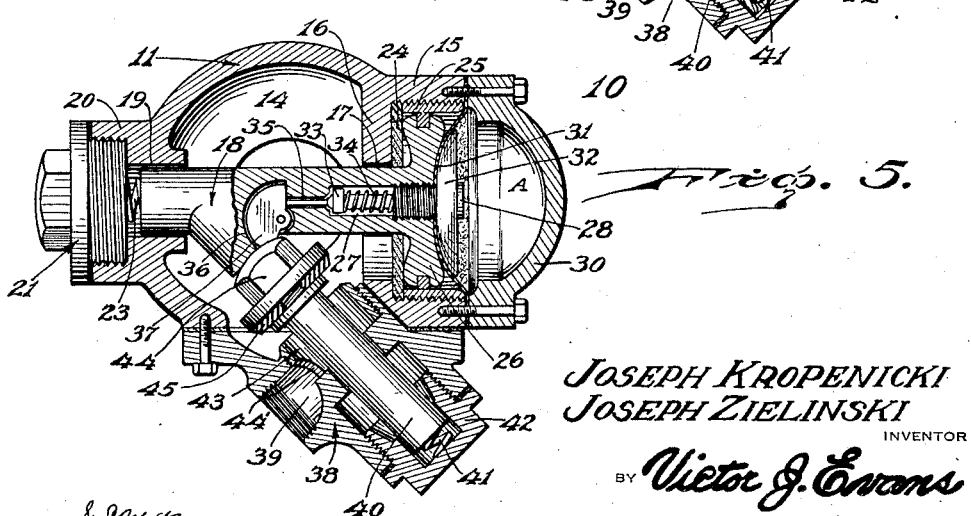

Patented May 7, 1929.

1,711,951

UNITED STATES PATENT OFFICE.

JOSEPH KROPENICKI, OF NEWARK, NEW JERSEY, AND JOSEPH ZIELINSKI, OF NEW YORK, N. Y., ASSIGNORS TO AUTOMATIC SAFETY CONTROL INC., OF NEWARK, NEW JERSEY, A CORPORATION.

AUTOMATIC CONTROL VALVE.

Application filed December 27, 1927. Serial No. 242,888.

This invention relates to improvements in automatic control valves for use in connection with the brake pipe line of air brake systems.

Some of the objects of the invention are, to provide emergency action throughout the length of a train where brake pipe pressure reduction is made at the emergency rate; to provide a positive emergency action through the train regardless of the gap between the locomotive brake valve on either the head or rear end when one or more cars of a train are cut out for any reason; to provide a positive emergency action when required throughout the train after full service reduction; to provide positive emergency after equalization of brakes and when brake pipe pressure is reduced to a predetermined point of danger; to provide positive service stability during service reductions; to provide positive closing of the air line after the vent valve has been opened to the atmosphere the required period of time; and to provide all requirements of present service conditions and to insure the necessary stability of operation.

Another object resides in an automatic brake pipe control valve which constitutes a separate device for operation independently of the usual triple valve or other venting device for installation in the brake pipe line where its operation can be assured when desired.

A further object is the provision of an automatic brake pipe valve for preventing the undesired quick action during service operations of the usual triple control valve which will effect positive quick action regardless of the length of the train, and regardless of any inoperative sections or gaps, and which further prevents fade away emergency actions which is very dangerous to trains.

With these and other objects in view, the invention resides in certain novel construction and arrangement of parts, the essential features of which are hereinafter fully described, are particularly pointed out in the appended claims, and are illustrated in the accompanying drawing, in which:—

Figure 3 is a vertical sectional view therethrough showing the parts in closing position.

Figure 4 is a similar view but showing the parts in service position.

Figure 5 is a similar view but showing the parts in a vent position.

Figure 1:
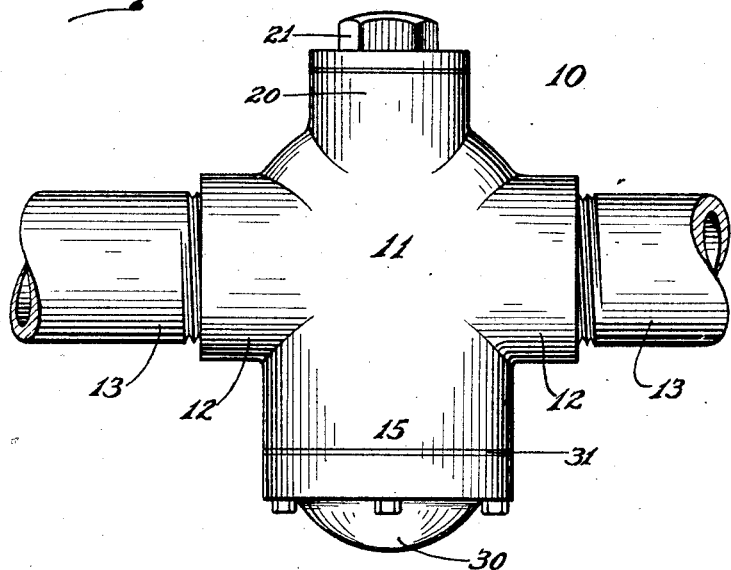
Figure 1 is a side elevation of our improved control valve arranged in the airbrake line.
Figure 2:
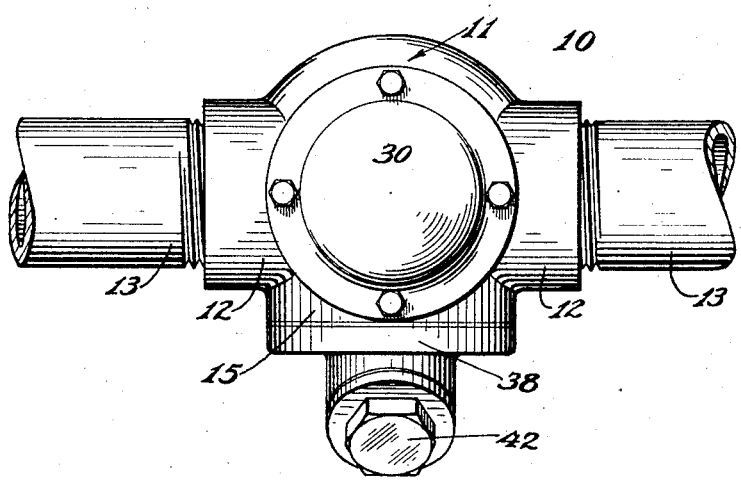
Figure 2 is a bottom plan view of the same.

Referring to the drawing by reference characters, the numeral 10 designates our control valve in its entirety, which includes a globular casing 11 having diametrically opposed nipples 12, 12 to which the meeting ends of the brake line pipe 13 connects. The interior of the casing constitutes a brake line pressure chamber 14 which is in open communication with the brake line pipes 13 whereupon an air pressure is built up in the chamber of an amount equal to the air pressure in the pipes. An internally screw threaded collar 15 is formed integral with the casing 11 and is disposed at right angle to the axis of the attaching nipples 12. A partition 16 separates the chamber 14 from the interior of the collar 15 and which has a central opening 17 therein for slidably supporting one end of a plunger rod 18. The other end of the piston rod has its bearing in a bore 19 provided in the opposite wall of the casing and which bore communicates with the interior of an internally screw threaded collar 20. Threaded to the collar 20 is a removable plug 21 having a well 22 therein for receiving one end of an expansion spring 23 interposed between the piston rod and the closed wall of the well.

Seated against the partition 16 for sealing the joint between the piston rod 18 and the walls of the opening 17 is a gasket 24, held seated by a sleeve or cylinder 25 threaded to the internally threaded collar 15. Fixed to the outer end of the piston rod is a piston head 26 having the usual piston ring for reciprocation in the cylinder 25.

The outer end of the piston is provided with a bore 27, the outer end of which is internally screw threaded to receive a headed plug 28 provided with an air orifice 29. Removably attached to the collar 15 is a cover plate 30 and held between the parts 15 and 30 is a flexible rubberized diaphragm 31 which is also held against the outer concave side of the piston head by a metal disk 32 and by the plug 28. The space between the piston head 26 and cover plate 30 constitutes an air actuating chamber A from which air is prevented from passing to the cylinder 25 by the flexible airtight diaphragm.

Slidably mounted within the bore 27 is a check valve 33 normally held seated by an expansion spring 34. The inner end of the check valve projects through a reduced bore 35 and into a recess 36 when in a closed position. Pivotally mounted in the recess 36 is a valve actuator or trigger 37.

Bolted to the underside of the casing is a casting 38 having a vent or exhaust opening 39 therein. Slidably mounted in a partition provided in the casting is a tubular valve rod 40 which is closed at one end against which one end of an expansion spring 41 abuts, the opposite end of the spring abutting a removable screw plug or cap 42. Threaded against the partition in the casting is a collar 43 having an opening 44' in register with the vent 39. The outer end of the collar constitutes a valve seat for a valve head 44 threaded to the inner end of the tubular valve rod 40. The valve head has a washer or cushion 45 on its underside for sealing engagement with its seat, while the outer end of the head is curved or convex for coaction with the trigger 37 and a concave seat 46 in the piston rod 18. The spring 41 is of a predetermined tension to allow the air pressure in the chamber 14 to normally hold the vent valve 44' closed, but which automatically opens when the air pressure therein reaches a predetermined low amount, such as when the air pressure in the air line is released when the motorman's or engineer's control valve is moved to an emergency position.

In practice, we have shown in Figure 3 of the drawings, the automatic valve in closing position at which time the brake pipe is empty of any compressed air. Briefly, the system is on lap or closing position whereupon the same is charged which causes compressed air or brake pipe pressure to accumulate within the chamber 14. As the pressure gradually increases, the same will enter the recess 36, pass through the passage 35, unseating the check valve 33 causing an air pressure to build up in the air actuating chamber A. When the air pressure in the chamber A overcomes the tension of the spring 23, the piston rod and head will move inwardly to the position shown in Figure 4 of the drawings. When in this position the trigger 37 and concave recess 46 are in the path of the valve head 44 and the valve is said to be in service position. The valve remains in the position shown in Figure 4 during all service conditions. In the event that the brake pipe pressure is reduced to a predetermined low degree, an emergency application of the brakes automatically occurs. In such case, the spring 41 overcomes the low air pressure upon the valve head 44 thus lifting the valve head to an open position which vents or bleeds any air remaining in the brake pipes through the vent opening 39. As the valve head 44 reaches the limit of its movement to open position, it strikes against the trigger 37 which pushes the check valve 33 to an open position to free the air in the actuating air chamber A. The valve head finally engages the concavity 46 and holds the trigger against the valve 33 until the air pressure in the chamber A has dropped below a predetermined amount, whereupon the spring 23 pushes the service piston 26 and valve head 44 to the position shown in Figure 3.

From the foregoing description, it will be seen that our automatic brake pipe control valve is exceptionally simple in construction and operation and is absolutely free of all complicated leak off chambers and independable working mechanism, thus assuring dependable quick action where positive and rapid venting of the brake pipe is necessary for effecting emergency action throughout the length of a train regardless of present train operating conditions.

This valve is intended to improve the operation of the usual triple valve by assuring positive emergency action without fade away. It might be here stated that the valve is installed in a horizontal brake pipe as shown in the drawings, and should be located direct on the air brake pipe line.

While we have described what we deem to be the most desirable embodiments of our invention, it is obvious that many of the details may be varied without in any way departing from the spirit of our invention, and we therefore do not limit ourselves to the exact details of construction herein set forth nor to anything less than the whole of our invention limited only by the appended claims.

What is claimed as new is:—

1. An automatic brake pipe control valve including a brake line pressure chamber, an air vent valve, spring means acting upon said vent valve for holding the same in an open position but being of a tension less than the normal brake line pressure within said chamber, and means responsive to the action of a reduced air pressure within said chamber for moving said vent valve to a closed position against the action of said spring means to allow an increased air pressure to be built up in said chamber.

2. An automatic brake pipe control valve comprising a casing formed to provide a brake line pressure chamber and an air actuating chamber, a reciprocable plunger having a passage establishing communication between said chambers, spring means acting against said piston, a check valve within said passage to permit air to pass through said passage from said pressure chamber to said actuating chamber to move said piston against the action of said spring means, a vent valve, spring means tending to hold said valve in an open position, said vent valve being held seated against the action of said spring means by the pressure of the brake pipe pressure in said pressure chamber, and a check valve actuating trigger disposed in the path of open movement of said vent valve to open said check valve to release the air in said actuating chamber when the air pressure in said pressure chamber drops to a predetermined degree.

3. An automatic brake pipe control valve comprising a casing formed to provide a brake pipe pressure chamber, a vent valve embodying a valve seat and a coacting valve head, spring means tending to hold said valve head in an unseated position, a reciprocable member engageable with said valve head for holding the same in a closed position when the pressure in said pressure chamber is at a predetermined low degree, and spring means acting against said reciprocable member to move the same in a direction to close said vent valve, the tension of said last spring means being greater than the tension of said first spring means but less than the brake pipe pressure in said pressure chamber.

4. In an automatic brake pipe control valve having an air pressure chamber adapted to be in open communication with the air line of an air brake system, an air vent valve subjected to the air pressure in said chamber to hold said vent valve in a closed position, spring means acting upon said vent valve for moving the same to an open position upon the reduction of air pressure in said pressure chamber below a predetermined degree, a vent valve closing means engageable therewith after the air in the chamber has been vented by the automatic opening of said vent valve.

5. An automatic brake pipe control valve comprising a casing having an air pressure chamber adapted for open communication with the brake pipe pressure of an air-brake system and an air actuating chamber, a reciprocable piston embodying a rod slidably mounted in bearings in said casing, and a head subjected to the action of air in said actuating chamber, said rod having a duct therein for establishing communication between said pressure chamber and said actuating chamber, a check valve within said duct for controlling the flow of air therethrough, a spring tending to hold said check valve in a service position, a check valve actuating member carried by said rod, a vent valve including a valve head movable into the path of said check valve actuating member, and a spring tending to move said valve head to an open position, substantially as and for the purpose specified.

In testimony whereof we have affixed our signatures.

JOSEPH KROPENICKI.
JOSEPH ZIELINSKI.